United States Patent [19]

Decker et al.

[11] Patent Number: 5,164,729

[45] Date of Patent: Nov. 17, 1992

[54] POLICE RADAR WARNING RECEIVER WITH AUTO-MUTE FUNCTION

[75] Inventors: Lawrence G. Decker, Loveland; Paul M. Allen, Cincinnati, both of Ohio

[73] Assignee: Cincinnati Microwave, Inc., Cincinnati, Ohio

[21] Appl. No.: 593,076

[22] Filed: Oct. 5, 1990

[51] Int. Cl.⁵ .......................... G01S 7/40; H04B 17/00
[52] U.S. Cl. .................................. 342/20; 455/266.1; 455/228
[58] Field of Search ................... 342/20; 455/226, 228, 455/227

[56] References Cited

U.S. PATENT DOCUMENTS

| | | | |
|---|---|---|---|
| 2,114,154 | 4/1938 | Steimel | 455/154.1 |
| 2,596,138 | 5/1952 | Feiner et al. | 328/225 |
| 2,826,691 | 3/1958 | Elliott | 331/106 |
| 2,930,000 | 3/1960 | Seler | 330/145 |
| 3,343,100 | 9/1967 | Medina | 379/372 |
| 3,346,857 | 10/1967 | Cromer, Jr. | 340/328 |
| 3,356,949 | 12/1967 | Jones, Jr. | 455/231 |
| 3,573,630 | 4/1971 | Baer | 340/825.44 |
| 3,683,346 | 8/1972 | Horton | 340/528 |
| 3,693,110 | 9/1972 | Briggs, Jr. et al. | 331/47 |
| 3,707,708 | 12/1972 | Dan | 340/503 |
| 3,873,921 | 3/1975 | Petrinec | 455/231 |
| 3,900,798 | 8/1975 | Pomerantz et al. | 455/231 |
| 3,924,262 | 12/1975 | Melancon | 340/964 |
| 3,931,621 | 1/1976 | Rose | 455/231 X |
| 3,955,185 | 5/1976 | Nishimura | 340/711 |
| 3,995,268 | 11/1976 | Ferrari | 331/47 X |
| 4,057,769 | 11/1977 | Woolf | 331/49 |
| 4,166,358 | 9/1979 | Tremblay et al. | 340/384 E |
| 4,237,448 | 12/1980 | Weinberg | 340/825.44 |
| 4,291,412 | 9/1981 | Imazeki | 340/811 X |
| 4,352,089 | 9/1982 | Yano et al. | 340/460 |
| 4,359,713 | 11/1982 | Tsunoda | 340/460 |
| 4,482,888 | 11/1984 | Todaka et al. | 340/384 E |
| 4,495,652 | 1/1985 | Leslie | 455/234.2 |
| 4,555,690 | 11/1985 | Fukushima et al. | 340/459 |
| 4,613,989 | 9/1986 | Fende et al. | 455/351 |
| 4,631,542 | 12/1986 | Grimsley | 342/20 |
| 4,675,654 | 6/1987 | Copeland | 340/502 |
| 5,049,884 | 9/1991 | Jaeger et al. | 342/20 |

Primary Examiner—John B. Sotomayor
Attorney, Agent, or Firm—Wood, Herron & Evans

[57] ABSTRACT

A police radar warning receiver includes an auto-mute feature by which a driver may be alerted to the presence of police radar but without the annoyance of an unnecessarily prolonged audible alarm. To this end, upon detection of the police radar signal, an audible alarm begins to beep at a selected intensity and at a beep rate corresponding to the strength of the signal. A predetermined time and/or a predetermined number of beeps after detection of the police radar signal, the intensity of the audible alarm is automatically reduced.

14 Claims, 2 Drawing Sheets

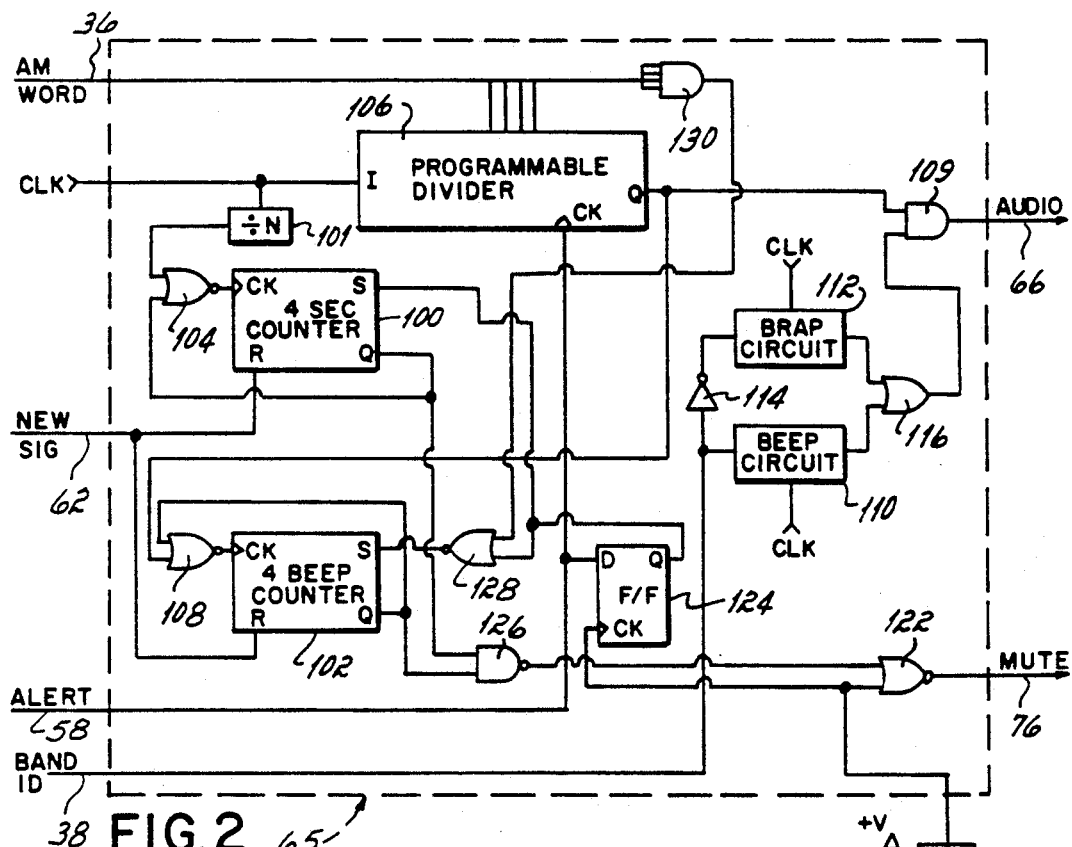
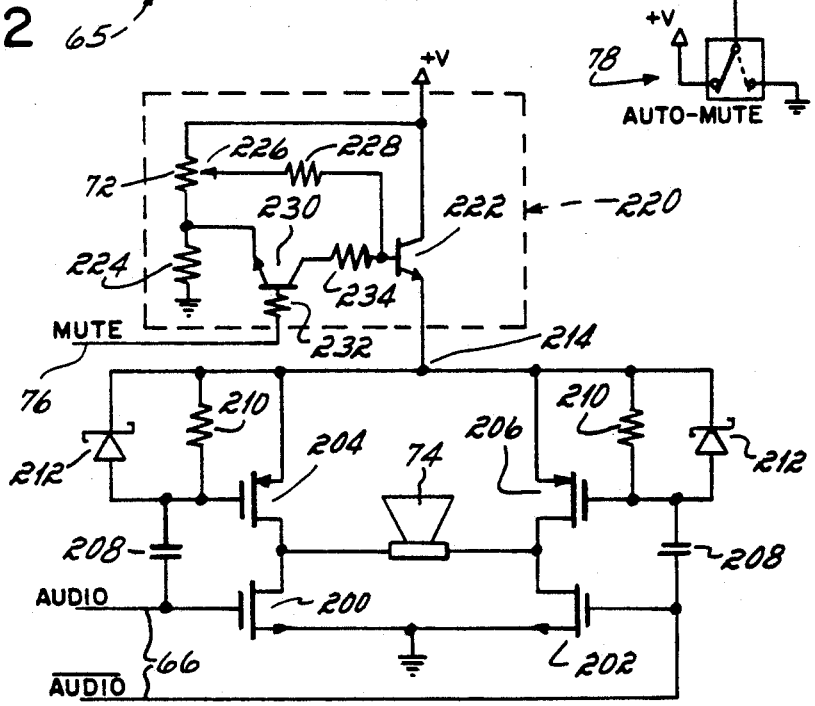

POLICE RADAR WARNING RECEIVER WITH AUTO-MUTE FUNCTION

BACKGROUND OF THE INVENTION

I. Field of the Invention

The present invention is directed to an improvement in vehicle-mounted police radar warning receivers, and more particularly to such a receiver in which the intensity or volume of an audio alarm indicator, for example, may be automatically reduced after it is first energized during a police radar alarm condition.

II. Description of the Prior Art

Police radar may operate, for example, in the X-band and K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. While transmitting, both continuous and pulsed radar transmit a signal which is generally at a fixed frequency within the selected band.

An electronic assembly referred to as a police radar warning receiver has been devised to detect the presence of police radar signals. An example is the PASSPORT radar warning receiver manufactured by the assignee herein, Cincinnati Microwave, Inc. of Cincinnati, Ohio. The police radar warning receiver is contained in a box-like housing which may be set on the dash or clipped to the visor of a vehicle, such as a passenger car or truck, motorcycle, boat or the like, which travels on land or water in areas subject to speed-monitoring radar surveillance by police. The front panel of the receiver faces the driver and has various indicators and control knobs. The receiver functions to detect the presence of the police radar and provide the driver or user with an audible and/or visual indication that his speed is being checked by radar.

The circuitry employed in the PASSPORT radar warning receiver to determine whether police radar signals are present is disclosed in aforementioned U.S. Pat. Nos. 4,313,216, and 4,581,769, which is also assigned to the assignee hereof.

When police radar is operating within range of the radar warning receiver, the driver is alerted by an alarm. For example, in the PASSPORT radar warning receiver, when a police radar alarm condition exists, i.e., when police radar is detected, a light is energized and an audible tone is generated. The audible tone is generated intermittently so as to sound like a series of beep tones or so-called "brap" tones, depending upon whether the received police radar signal is in the X- or K-band, respectively. The intensity or loudness of the beep or brap tones is determined by the setting of the volume adjust selected by the driver. However, the rate of beeping, i.e., the delay between each beep or brap tone, is inversely proportional to the strength of the received police radar such that the "beep rate" increases as the vehicle nears the source of police radar until the signal is so strong that the beeping or brapping tones will sound continuously.

The alarm in the PASSPORT radar warning receiver is energized for a minimum of about four seconds whenever a police radar signal is detected, so the driver will be alerted even when brief signals from pulsed radar are involved. Also, if the police officer triggers the unit within four seconds of the first trigger, the PASSPORT radar warning receiver's alarm will remain energized rather than terminate and sound a new warning. Similarly, with continuous radar, the alarm is energized for as long as the radar warning receiver can detect the radar signal plus the four additional seconds.

The radar warning receiver is sensitive enough to detect a police radar signal, even though the radar unit may be some distance away. As a result, the vehicle in which the radar warning receiver is mounted may travel quite a distance before the radar signal becomes too weak to detect. Hence, the alarms are likely to be energized for quite some time.

During prolonged alarm conditions, the alarms, especially the audible alarm, may tend to become an annoyance. Once the alarm is noticed, the driver may prefer to disable the audible alarm, for example, for the remaining time during which the alarm condition is present. To this end, the PASSPORT radar warning receiver is provided with a manual mute function. As described more fully in U.S. Pat. No. 4,631,542, also assigned to Cincinnati Microwave, Inc., the driver may manually cause termination of the alarm after the driver becomes aware of the alarm condition by physically depressing a momentary switch to terminate the alarm after becoming aware of the alarm condition. Under certain conditions, a driver may not be able to readily mute the audio alarm in this way, allowing the alarm to become an annoyance. Further, several separate alarm conditions may arise during the course of a long highway drive, for example. The driver may, thus, have to manually mute the audio alarm on several separate occasions.

SUMMARY OF THE INVENTION

The present invention provides an automatically-acting mechanism to reduce the alarm intensity during and notwithstanding persistence of an alarm condition but which allows a full intensity alarm on the next subsequent alarm condition. To this end, alarm intensity is automatically reduced or muted after a delay period beginning with the onset of the alarm condition and throughout the remainder of that alarm condition. Preferably, the delay period is not less than a predetermined minimum, such as four seconds. More particularly, alarm intensity is automatically reduced in accordance with the principles of the present invention so as to minimize the likelihood that a driver will miss being alerted to a weak signal, while also reducing annoyance of a long-sounding alarm due to strong signals.

As will be appreciated, merely reducing alarm intensity, even automatically, a predetermined time after the alarm is first energized, such as four seconds, may not be desirable under all circumstances. For example, where weak signals are detected, the interval between beeps (or braps) may be sufficiently long that the driver may not become fully cognizant of the alarm condition for an extended period of time (e.g., greater than four seconds). If the alarm intensity were reduced prematurely, therefore, the driver might not learn of the alarm condition with sufficient time to react properly to the presence of police radar. On the other hand, if the fixed duration of regular alarm intensity were long enough to take the weak signal situation into account, then strong signals would present a source of annoyance otherwise sought to be eliminated by automatically reducing alarm intensity. Thus, in accordance with the principles of the present invention, the delay period at which alarm intensity is reduced is inversely related to the strength of the received police radar signal. Consequently, upon receipt of strong police radar signals where the beep rate is likely to be sufficiently fast that the driver should notice it almost immediately after the alarm is first energized, the intensity of the alarm is reduced only a short time after the alarm is first energized to avoid annoying the driver. On the other hand, reception of weak police radar signals will result in a beep rate that is likely to be sufficiently slow that the alarm may not be noticed as quickly, nor is it likely to become an annoyance as quickly. Hence, upon reception of weak police radar signals, the intensity of the alarm will be maintained for a longer period of time before being reduced.

By virtue of the foregoing, there is thus provided an improvement in police radar warning receivers by which a driver may be alerted to the presence of police radar, but without the annoyance of an unnecessarily prolonged audible alarm.

Other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above, and the detailed description of the embodiments, serve to explain the principles of the present invention.

FIG. 2 is a schematic diagram of the alarm processor of FIG. 1; and

FIG. 3 is a schematic diagram of the amplifier of FIG. 1.

DETAILED DESCRIPTION OF THE DRAWINGS

Figure 1:
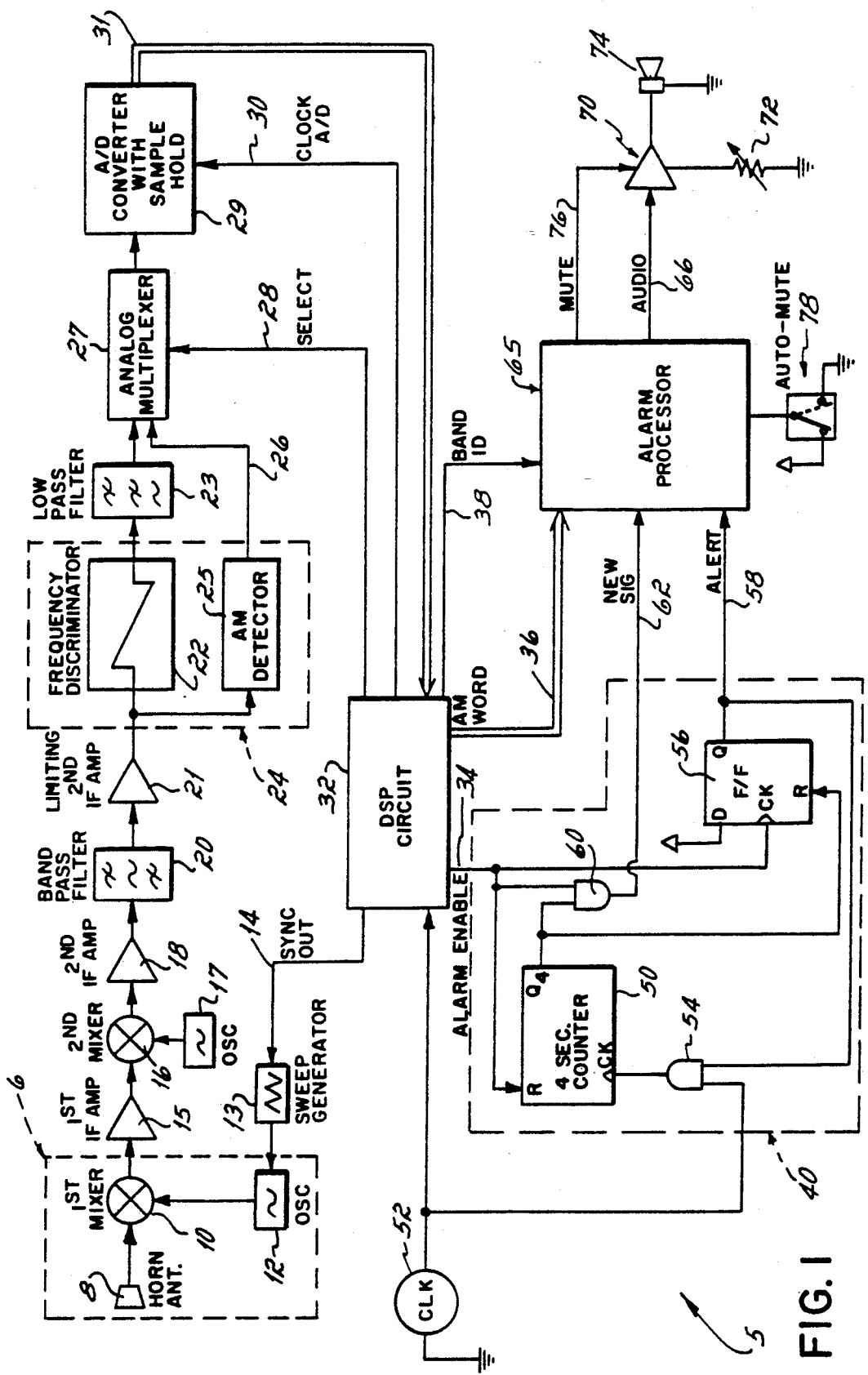
FIG. 1 is a block diagram of a radar warning receiver according to the principles of the present invention.

With reference to FIG. 1, there is shown a block diagram of a radar warning receiver 5 according to the principles of the present invention. Pulsed or continuous signals occurring in the X-band or K-band are received by an antenna system 6 which includes horn antenna 8 coupled to first mixer 10 to which the signals received by horn antenna 8 are directed. Horn antenna 8 may include filters for preventing signals at unwanted frequencies from being passed to first mixer 10, and it may further include other filters for preventing outward radiation therefrom of internally generated radio frequency signals. Coupled to first mixer 10 is a variable frequency first local oscillator 12 adapted to be swept in frequency over a range of frequencies as described in aforementioned U.S. Pat. No. 4,313,216, the disclosure of which is incorporated herein by reference.

The frequency of the oscillator signal generated by local oscillator 12 varies, i.e., it is swept, across a predetermined band or bands of frequencies by a sweep generator 13 which causes the local oscillator signal to vary from a first frequency to a second frequency in a controlled manner in response to receipt of a sync pulse on sync out line 14. The varying frequency signal generated by local oscillator 1 is mixed with received signals from horn antenna 8 in first mixer 10 to generate first IF signals which are coupled to first IF amplifier 15. The output of amplifier 15 is coupled to a second mixer 16 such as a SAW mixer whereat the first IF signals are mixed with a fixed frequency oscillator signal from second local oscillator 17 to produce second IF signals which are amplified by second IF amplifier 18. The frequency of oscillator 17 is selected so that during the sweep of oscillator 12, any received signal in the desired band(s) mixed with the signal from oscillator 12 will generate two IF signals, one being a primary and one being an image as is well understood. The output of amplifier 18 is coupled through bandpass filter 20 and limiting second IF amplifier 21 to frequency discriminator circuit 22. The output of discriminator 22 is coupled to low pass filter 23 which preferably has a corner frequency of less than 8 KHz and more preferably about 6 KHz. Operation of the foregoing is generally as described in aforesaid U.S. Pat. No. 4,313,216.

FM discriminator 22 is preferably part of an FM receiver IF 24 (such as an LM3089 available from National Semiconductor Corporation, Santa Clara, Calif.; or an NE604 available from Signetics Corporation, Sunnyvale, Calif.) and includes an AM detector 25 driven by the same IF output from amplifier 21 to produce another analog signal on output 26 corresponding to the strength of the signal received at the frequency to which receiver 5 is tuned by oscillator 12 at that time.

The output of low pass filter 23 is coupled to a first input of analog multiplexer 27. Similarly, the AM output 26 of IF 24 is coupled to a second input of analog multiplexer 27. In a first state of multiplexer 27, as determined by the state of select signal 28, the output of filter 23 is coupled to analog-to-digital (A/D) converter 29 whereas, in a second state of multiplexer 27, AM detector output 26 is coupled to A/D converter 29. Low pass filter 23 also has gain in the pass band which is set such that the noise level from frequency discriminator 22 is nearly full-scale into A/D converter 29. A/D converter 29 includes a sample hold storage buffer which stores the input signal in response to a clock A/D signal 30.

As described in greater detail in copending application Ser. No. 07/558,668, filed Jul. 27, 1990, a DSP circuit 32 is programmed to initiate each sweep of oscillator 12 by a sync out signal 14. Then, as each sweep of oscillator 12 progresses, A/D converter 29 samples the FM discriminator and AM detector outputs at sample intervals as dictated by select 28 and clock A/D pulse 30 from DSP processor 32. A/D converter 29 thus produces on output 31 a series of digital sample words, each corresponding to the magnitude of RF energy received by antenna 8 at the frequency or frequencies to which receiver 5 is tuned by oscillator 12 at that sample interval. As further described in aforesaid application Ser. No. 07/558,668, DSP circuit 32 is also programmed to evaluate the digital words on output 31 in a manner which advantageously maximizes the sensitivity of receiver 5 under the signal and noise conditions prevailing at the time, and locate those sample intervals in the sweep during which police radar was likely received by antenna 8, if at all. If such sample intervals are located, DSP circuit 32 outputs an alarm enable pulse (on line 34) indicative of a police radar alarm condition, an AM word (on lines 36) corresponding to the signal strength of the received police radar signal, and a BAND ID signal (on line 38) indicative of the band of the received police radar signal (e.g., X- or K-band). The disclosure of aforementioned application Ser. No. 07/558,668 more fully describing how the above signals are generated is incorporated herein by reference.

The alarm enable pulse 34 is utilized by alert monitor 40 to reset four-second timer 50 at the end of each such alarm enable pulse 34. As a consequence, the output (Q4) of timer 50 will be held low until four-seconds after the police radar alarm condition has ceased (i.e., four seconds of sweeps of oscillator 12 without any alarm enable pulses being produced). Thereafter, output Q4 will be held high until a subsequent alarm enable pulse 34 is received. Timer 50 counts in response to clock pulses from system clock 52 when AND gate 54 is enabled and stops counting when AND gate 54 is disabled. To this end, AND gate 54 is responsive to the output from flip-flop 56. Flip-flop 56 is clocked with each alarm enable pulse 34 to output an alert signal on output line 58 which output remains high until flip-flop 56 is reset by the Q4 output of timer 50 going high. Thus, upon receipt of the first alarm enable pulse 34 associated with a police radar alarm condition, an alert 58 will be issued and remain until timer 50 times out (four seconds after the police radar alarm condition ceases). The alert 58 also enables AND gate 54 to initiate counting by timer 50. When timer 50 times out, output Q4 will go high, resetting latch 56 to terminate alert 58 and disabling AND gate 54, thereby stopping timer 50 from counting. Consequently, output Q4 of timer 50 will be held in a logical high state.

Timer 50 is reset at the end of an alarm enable pulse 54. Thus, during the first such pulse received during a police radar alarm condition, output Q4 will be high causing AND gate 60 to be enabled. Consequently, the first pulse 34 of each truly new alarm condition (four seconds or more after a prior alarm condition), will result in AND gate 60 duplicating that first pulse as a NEW SIG pulse on line 62. Thereafter, AND gate 60 will be disabled by a low output Q4 from timer 50 for the remainder of the police radar alarm condition so that alarm enable pulses during persistence of that condition (plus four seconds) do not result in generation of a further NEW SIG 62 The alert and NEW SIG signals from alert monitor 40 are coupled to alarm processor 65 along with BAND ID 38 and AM word 36 whereat the auto-mute function of the present invention is implemented. Alert monitor 40 could be included within the functionality of DSP circuit 32. Also, as will be readily appreciated by those skilled in the art, while the signals (alert, NEW SIG, BAND ID and AM word) are shown coupled in parallel over multiple lines to alarm processor 65, they could be coupled over a single line in serial fashion.

As will be described in greater detail below, in response to alert 58, alarm processor 65 outputs either BRAP or BEEP audio driver signals on audio output 66, depending upon the state of BAND ID signal 38 and at a beep rate corresponding to the AM word. The audio driver signals 66 are normally amplified by amplifier 70 at a gain corresponding to the volume set at potentiometer 72 by the driver (not shown) so as to provide audible beep or brap tones on speaker 74 during (and for four-seconds after) each police radar alarm condition to thereby alert the driver to the presence of police radar. Alarm processor 65 may be placed into an auto-mute mode by placing auto-mute switch 78 in the position shown in phantom line in FIG. 1, whereby to automatically reduce the gain of amplifier 70 in response to a mute signal on line 76, thereby reducing the intensity or volume of the audible alarm from speaker 74 for the remaining duration of the alarm condition. To disable the auto-mute function, auto-mute switch 78 is placed in the position shown in solid line in FIG. 1 such that the audible alarm will be maintained at the normal volume based upon the setting of volume adjust potentiometer 72 for the duration of the alarm condition.

In the auto-mute mode, and in accordance with the principles of the present invention, the automatic reduction or muting occurs after a delay period beginning with the initiation of the police radar alarm condition and ending after a period of time correlated to the magnitude of the received police radar signal so as to minimize the likelihood that a driver (not shown) will miss being alerted to a weak signal, while also reducing annoyance of a long, loud alarm due to strong signals. Specifically, the delay period between the initial sounding of audible alarm 74 at the driver-selected volume and the time at which the intensity or volume of that alarm is reduced or muted is inversely related to the strength of the police radar signal received at antenna 8, as will now be described with reference to FIG. 2.

Alarm processor 65 includes a four-second counter 100 and a four-beep counter 102, each of which is reset to zero upon receipt of a NEW SIG pulse 62 indicating that a new police radar alarm condition has occurred, necessitating the beep and second counters for muting the audible alarm in accordance with the principles of the present invention. Pulses from system clock 52 are divided by fixed divider 101 and coupled through NOR gate 104 to increment four-second counter 100 to count up to four seconds. When counter 100 reaches a four-second count, the output Q goes high indicating that the four second timer has timed out and also disabling NOR gate 104 to thereby halt the count of counter 100. Beep counter 102, on the other hand, is responsive to system clock 52 through a programmable divider 106, the output of which drives NOR gate 108. Similar to counter 100, when counter 102 counts four pulses from programmable divider 106 corresponding to four beeps (for convenience, "beep" is a reference to either "beep" or "brap") at speaker 74, the output Q of counter 102 goes high thereby indicating that the alarm has sounded enough to alert the driver (not shown) based upon the strength of the received signal. Also, NOR gate 108 is disabled to halt the count of counter 102. The "time out" and "strength out" signals from counters 100 and 102, respectively, are utilized to cause the gain of amplifier 70 to be reduced for the remainder of the alarm condition, but starting after a delay time correlated to the strength of the received signal and with a minimum four second delay.

Programmable divider 106 receives its input from system clock 52 and divides system clock 52 pulses by a divisor corresponding to AM word 36 so as to provide on the Q output of programmable divider 106 a pulse at a rate correlated to the strength of the received police radar signal. The Q output of programmable divider 106 is also coupled to AND gate 109 through which is output either BEEP or BRAP audio driving signals depending upon whether beep circuit 110 or brap circuit 112 is enabled by BAND ID signal 38 from DSP circuit 32. To this end, the BAND ID signal 38 enables beep circuit 110 in one state (with brap circuit 112 disabled) and, due to inverter 114, enables brap circuit 112 in the opposite state (and disables beep circuit 110). The outputs of circuits 110 and 112 are coupled through OR gate 116 to the other input of AND gate 109 so as to couple the appropriate audio driving signals to amplifier 70 for generating the beep tones at speaker 74 at a beep rate correlated to the strength of the received police radar signal.

Auto-mute switch 78 is coupled to NOR gate 122 and D-type flip-flop 124. In the solid line position of switch 78 shown in FIG. 2, the auto-mute function of the present invention is disabled in that the output of NOR gate 122 is driven low. When the output of NOR gate 122 is high, a mute signal is provided on output 76 to thereby reduce the gain of amplifier 70, thereby muting the intensity of the alarm on speaker 74. As will be appreciated, unless auto-mute switch 78 is in the position shown in phantom line in FIG. 2, NOR gate 122 will provide nothing but a low signal. However, with auto-mute switch 78 in the position shown in phantom line, NOR gate 122 is enabled to respond to signals from NAND gate 126, as will now be described.

Upon changing the state of switch 78 from the position shown in solid line to the position shown in phantom line, flip-flop 124 is clocked. If, when flip-flop 124 is clocked, there is extant a police radar alarm condition (alert 58 is already high), the Q output of flip-flop 124 will, via NOR gate 128, immediately set four-beep counter 102 to drive its output Q high thereby providing the "strength out" signal and stopping the count of counter 102. Simultaneously, four-second counter 100 will likewise be set to provide the "time out" signal as though it had reached its full count. When both the "strength out" and "time out" signals have been provided, either because four seconds and four beeps have elapsed, or because the respective counters were set during a police radar alarm condition by changing the state of switch 78, and with switch 78 in the phantom line position shown in FIG. 2, NAND gate 126 will be driven low thereby causing NOR gate 122 to act as an inverter to drive the mute signal high for the remainder of the alarm condition. The high mute signal automatically mutes the audible alarm.

Additionally, beep counter 102 is responsive to the AM word through AND gate 130. In the event the received signal strength is above a predetermined maximum, the AM word from DSP circuit 32 will be set to all ones, for example. As a consequence, AND gate 130 will output a high to NOR gate 128, thereby causing beep counter 102 to output the "strength out" signal as if four beeps had occurred. Thus, when the alarm intensity is so strong that more than four seconds of alarm would be considered annoying, four-second counter 100 controls when the alarm sound will be muted. However, if the intensity of the received signal is not so strong, four seconds of alarm sounding time may be insufficient to fully alert the driver to the presence of the police radar. As is now apparent, the beep rate increases as signal strength increases and, therefore, the four-beep counter will count more or less quickly depending upon the received signal strength. To this end, the four-beep counter will count to four in a time period longer than four seconds, but less than the maximum time it would take to achieve four beeps at the minimum strength to which radar warning receiver system 5 can respond. Consequently, automatic muting will occur after a delay time inversely proportional to the strength of the received signal (but with a minimum delay time). Also, at the beginning of a new alarm condition, a NEW SIG pulse 62 will be generated thereby resetting counters 100 and 102 to allow the new alarm to initially sound at normal intensity followed by automatic muting in accordance with the principles of the present invention. Alarm processor 65 may operate in a third mode (not shown) with a manually induced mute like that shown in aforementioned U.S. Pat. No. 4,631,542, the disclosure of which is incorporated herein by reference.

The AM word may vary as signal strength varies from sweep to sweep. Preferably, an increase in received signal strength in one sweep from the prior sweep automatically results in a larger magnitude AM word and faster beep rate. On the other hand, as the signal strength decreases from sweep to sweep, the earlier and larger magnitude AM word may be maintained for a time, such as two seconds, followed by a gradual reduction over several sweeps to correspond to the then-current lower strength signal, unless interrupted by an intervening higher strength received signal. Also, in the absence of a police radar alarm condition during the four second extension of the alarm condition provided by four second timer 50 (no enable pulses 34), the AM word may be similarly ramped down to a minimum beep rate so as to simulate fading away of the police radar signal as would occur as the driver (not shown) passes beyond the range of the police radar, thus alerting the driver to the end of the alarm condition.

Turning now to FIG. 3, there is shown an embodiment of amplifier 70 in a bridge configuration responsive to differential audio signals 66. To this end, circuitry (not shown) may be provided between AND gate 109 (FIG. 2) and amplifier 70 to provide the differential audio signals in a non-overlapping fashion so that both sides of the bridge amplifier are not on at the same time. One of the audio signals (AUDIO) is coupled to the gate of N-channel transistor 200 while the opposite polarity audio signal ($\overline{\text{AUDIO}}$) is coupled to the gate of second N-channel transistor 202. The sources of transistors 200, 202 are grounded and the drains are coupled across speaker 74 and to the drains of P-channel transistors 204, 206. The gate of transistor 204 is capacitively coupled to AUDIO while the gate of transistor 206 is capacitively coupled to $\overline{\text{AUDIO}}$, each by 0.1 microfarad capacitors 208. The sources of transistors 204, 206 are fed back to their respective gates via an 1 megohm resistor 210, and through reversed biased Schottky diode 212. Diodes 212 may be a dual Schottky package available from Motorola Semiconductors, Phoenix, Ariz. Part No. BAR43C. The N-channel transistors 200, 202 may be BSS138 transistors available from Seimens Components, South Iselin, N.J., while the P-channels may be Part No. BSS84 also available from Seimens Components.

Transistors 200, 202, 204 and 206 comprise a bridge amplifier circuit which amplifies the differential audio signals 66 to speaker 74 at a gain reflected by the bias at node 214 as set by gain set circuit 220. To this end, gain set circuit 220 includes NPN transistor 222 driven by a voltage divider comprised of 5 kilohm volume adjust potentiometer 72 and 1.5 kilohm resistor 224. The divided voltage signal is coupled from the wiper 226 of potentiometer 72 through 10 kilohm resistor 228 to the base of transistor 222, the collector of which is tied to the same source of supply such as 9 volts (not shown) as the top end of potentiometer 72. At the onset of an alarm condition, the mute signal is low. As a consequence, NPN transistor switch 230 (coupled to line 76 via 100 kilohm resistor 232) is cut off such that the gain of bridge amplifier circuit and, hence, the intensity of the audible alarm at speaker 74 is dependent solely upon the setting of potentiometer 72. However, when mute signal 76 goes high as occurs in the auto-mute mode of the invention, transistor 230 is switched on or closed to thereby shunt the voltage divider network with 10 ohm resistor 234. With switch 230 closed, resistor 234 is coupled between the junction of potentiometer 72 and resistor 224 on the one hand and the base of transistor 222 on the other. The result is to change the bias at node 214 sufficient to reduce the gain of the bridge amplifier circuit by approximately one-half, thereby reducing the intensity of the alarm. NPN transistor 222 may be an MMBTA13 or MMBTA14, available from Motorola Semiconductors, whereas transistor 230 may be an MMBT3904 transistor, also available from Motorola Semiconductors.

In operation in the auto-mute mode, receipt of a signal at antenna 8 likely to be a police radar signal will cause alarm enable pulses 34 to be output by DSP circuit 32 indicating that a police radar signal has been detected. Upon the first such pulse for a new alarm condition, alarm processor 65 will be reset in response to NEW SIG 62. Also, for so long as pulses 34 are present (and for four seconds thereafter), alarm processor 65 will be enabled by the alert signal 58 and, in conjunction with BAND ID 38 and AM word 36 to DSP circuit 32, will generate audio beep and brap tones on speaker 74 at a beep rate corresponding to the strength of the received police radar signal and at a volume preselected by the driver. Thereafter, and during the alarm condition (or the four second extension of the alarm condition) the intensity of the audible alarm will be reduced after a delay time inversely correlated to the strength of the received signal. The minimum delay time to muting is four seconds, and the maximum is based upon the minimum beep rate, such that for a strong received signal, the muting will occur after a time sufficient for the driver to become alerted to the alarm condition, but not to have become annoyed by the alarm, whereas with weak signals, the normal intensity audible alarm will be maintained for a longer time so as to be sure that the driver is alerted.

By virtue of the foregoing, there is thus provided an automatically acting mechanism to reduce the alarm intensity during and notwithstanding persistence of an alarm condition, but in a manner so as to minimize the likelihood that a driver will miss being alerted to a weak signal, while also reducing annoyance of a long-sounding alarm due to strong signals. Additional advantages and modifications will readily appear to those skilled in the art. For example, although mute signal 76 is shown as having only an on state and an off state (logic high and low) whereby to mute or unmute speaker 74, it will be appreciated that alarm processor 65 could be configured to provide a variable analog signal on mute line 76 so as to vary the gain of amplifier 70, such as with a ramping down of the volume of the audible alarm after the four-second and four-beep counters 100, 102 have timed out, rather than simply changing the audible level by a fixed ratio. Further, alarm processor 65 could be configured to utilize only one of counters 100, 102 so as to have either a fixed delay time on the one hand, or a variable delay time with no fixed time minimum on the other. The invention in its broader aspects is therefore not limited to the specific details, representative apparatus and method, in the illustrative example shown and described. Accordingly, departures may be made from such details without departing from the spirit or scope of Applicants, general inventive concept.

What is claimed is:

1. A police radar warning receiver comprising:

receiver means for detecting a police radar signal;

alarm means responsive to the receiver means for generating an alarm at a selected intensity upon initial detection of the police radar signal by the receiver means, said alarm means normally maintaining the alarm at the selected intensity for at least so long as the receiver means detects the police radar signal; and mute means for automatically reducing the intensity of the alarm after a delay time correlated to strength of the detected police radar signal.

2. The police radar warning receiver of claim 1, said mute means including:

timing means responsive to said receiver means for generating a time out signal a predetermined time signal after initial detection of the police radar signal;

strength means responsive to said receiver means for generating a strength out signal a period of time after initial detection of the police radar signal, the period of time being correlated to the strength of the detected police radar signal; and output means for automatically reducing the intensity of the alarm after generation of both said time out and strength out signals.

3. The police radar warning receiver of claim 2, said alarm means including intermittent beeper means for generating intermittent audible beep pulses at a beep rate corresponding to strength of the detected police radar signal, said strength means including counter means for counting beep pulses to generate the strength out signal upon counting a predetermined number of the beep pulses.

4. The police radar warning receiver of claim 1, said alarm means including intermittent beeper means for generating intermittent audible beep pulses at a beep rate corresponding to strength of the detected police radar signal, said mute means including counter means responsive to the beep pulses for determining the end of the delay time.

5. The police radar warning receiver of claim 1, said mute means including means for determining the delay time in inverse proportional relationship to strength of the detected police radar signal.

6. A method of alerting to the presence of police radar without the annoyance of an unnecessarily prolonged alarm comprising:

detecting a police radar signal;

generating an alarm at a selected intensity upon initial detection of the police radar signal;

normally maintaining the alarm at the selected intensity for at least as long as the police radar signal is being detected; and automatically reducing the intensity of the alarm after a delay time correlated to strength of the detected police radar signal.

7. The method of claim 6 further comprising:

generating a time out signal a predetermined time after initial detection of the police radar signal;

generating a strength out signal a period of time after initial detection of the police radar signal, the period of time being correlated to the strength of the detected police radar signal; and automatically reducing the intensity of the alarm after generation of both said time out and said strength out signals.

8. The method of claim 7 further comprising:

generating an alarm by generating intermittent audible beep pulses at a beep rate corresponding to strength of the detected police radar signal; and generating the strength out signal upon counting a predetermined number of the beep pulses.

9. The method of claim 6 further comprising:

generating an alarm by generating intermittent audible beep pulses at a beep rate corresponding to strength of the detected police radar signal; and determining the end of the delay time by counting the beep pulses.

10. The method of claim 6 further comprising:

determining the delay time in inverse proportional relationship to strength of the detected police radar signal.

11. A police radar warning receiver comprising:

receiver means for detecting a police radar signal, said receiver means providing an alert signal for at least so long as the police radar signal is being detected, said receiver means also providing an AM signal having a magnitude corresponding to the strength of the detected police radar signal;

audio alarm means for emitting an audible alarm at a selected intensity in response to the alert signal;

timing means responsive to the alert signal for providing a time out signal a predetermined time after first being provided the alert signal;

strength means responsive to the alert signal and the AM signal for providing a strength out signal a period of time after first being provided said alert signal, said period of time being correlated to the magnitude of the AM signal; and mute means responsive to provision of the time out and strength out signals for automatically reducing the intensity of the audible alarm whereby to alert to the presence of police radar and then automute the audible alarm without the annoyance of an unnecessarily prolonged audible alarm.

12. The police radar warning receiver of claim 11, the audio alarm means including beep rate means for pulsing the audible alarm on and off at a beep rate corresponding to the strength of the detected police radar signal, said strength means including counter means counting on and off pulses to the audible alarm for generating the strength out signal upon counting a predetermined number of the pulses.

13. A police radar warning receiver comprising:

oscillator means for generating an oscillator signal which is swept in frequency between a first frequency and a second frequency;

mixer means for mixing the oscillator signal with received police radar signals to provide IF signals;

circuit means responsive to the IF signals for generating an alarm enable upon detecting that a police radar signal has been received during a given sweep of the oscillator means;

alarm means responsive to the generation of the alarm enable for generating an alarm at a selected intensity, the alarm means normally maintaining the alarm at the selected intensity for at least the duration of a plurality of the next succeeding sweeps of the oscillator means; and mute means for automatically reducing the intensity of the alarm a predetermined time after the alarm enable is initially generated.

14. A method of alerting to the presence of police radar without the annoyance of an unnecessarily prolonged alarm comprising:

repeatedly sweeping an oscillator signal between a first frequency and a second frequency;

mixing the oscillator signal with received police radar signals to provide IF signals;

responsive to the IF signals, generating an alarm enable upon detecting that a police radar signal has been received during a given sweep of the oscillator signal;

responsive to the generation of the alarm enable, generating an alarm at a selected intensity;

normally maintaining the alarm at the selected intensity for at least the duration of a plurality of the next succeeding sweeps of the oscillator signal; and automatically reducing the intensity of the alarm a predetermined time after the alarm enable is initially generated.

* * * * *